June 17, 1969  J. M. SUDDARTH  3,449,866

AUTOMATIC CRIBBING DEVICE

Filed Oct. 28, 1966

INVENTOR
JACK M. SUDDARTH
BY *Rabillard and Byrne*
ATTORNEYS

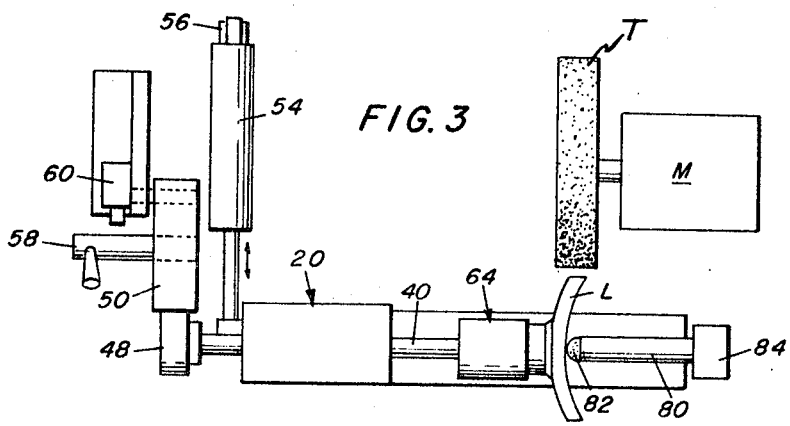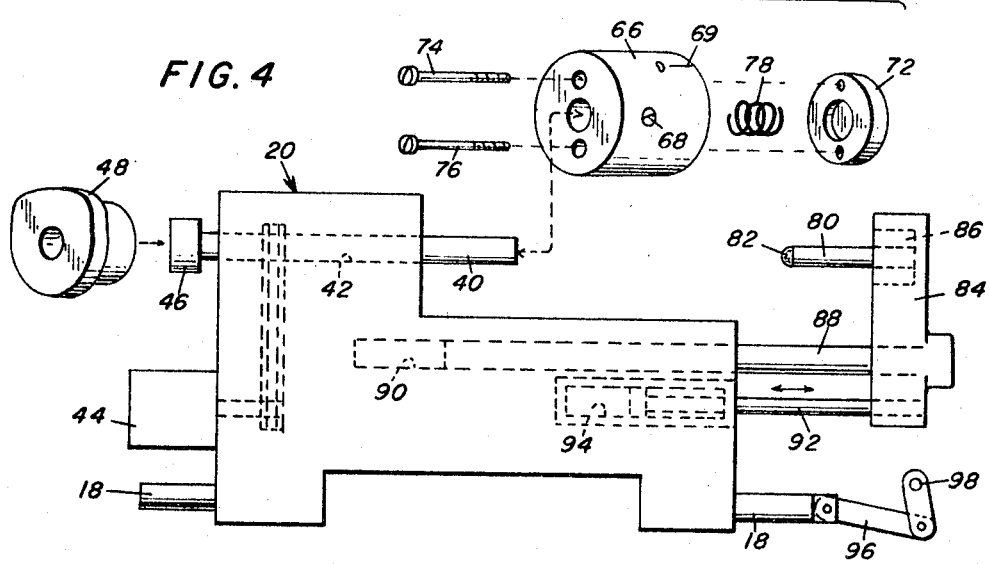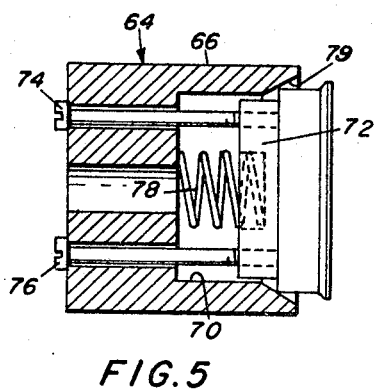

United States Patent Office 3,449,866
Patented June 17, 1969

3,449,866
AUTOMATIC CRIBBING DEVICE
Jack M. Suddarth, Muskogee, Okla., assignor to Colurn Manufacturing Company, Inc., Muskogee, Okla., a corporation of Oklahoma
Filed Oct. 28, 1966, Ser. No. 590,395
Int. Cl. B24b 7/00, 9/00
U.S. Cl. 51—101    5 Claims

ABSTRACT OF THE DISCLOSURE

Apparatus for removing excess glass from the edges of an opthamalic lens blank comprising an abrading tool, a lens support movable toward and away from the abrading tool, a pattern control mechanism riding on a first cam and a second cam mounted on said first cam being adjustable to provide quick adjustment in situations where more than the normal amount is to be trimmed from the edge of the lens blank. The second cam engages a microswitch which controls the operation of the pattern mechanism. The lens blank holding means comprises a chuck having a depression therein, a member slidably received in said depression, a spring in the depression between the depression bottom and the outer end thereof for biasing said member toward said outer end such that when the block is loaded into said depression, the member is moved against the bias.

---

This invention relates generally to a means for removing excess glass from the edges of an ophthalmic lens blank.

With the advent of severe stylings in the ophthalmic lens art, lens blank manufacturers have increased the diameter of their standard lens blank to accommodate the many lens shapes now available to the public. This causes an excess of glass to overhang the lens block during the processes of beveling and curve generation. At the present state of the art, the lens beveling and lens finishing equipment is unable to accommodate the large glass hangover without causing excessive breakage. As a result of this, lens finishing technicians presently "crib" or break the edges of the lens blank periphery usually with specially designed plier-like instruments. This manual cribbing operation is time consuming and even skilled operators oftentimes crib the edges more than necessary.

Therefore a primary objective of this invention is to reduce the instances of breakage by providing a novel means for cribbing or reducing the diameter of the lens to workable dimensions.

Another objective of this invention is to provide a lens cribbing apparatus which greatly reduces the amount of time in which to reduce lens dimensions to workable sizes.

A still further objective of this invention is to provide a method of lens cribbing heretofore unknown to the lens finishing art.

A further objective of this invention is to provide a novel means in which the lens blank to be cribbed is quickly oriented with respect to the cribbing apparatus and is quickly chucked and removed therefrom.

These and other objectives of the invention will become better understood to those skilled in the art by reference to the following detailed description when viewed in light of the accompanying drawings wherein like numerals indicate like elements throughout the figures thereof and wherein:

FIGURE 3 is a diagrammatic plan view;

FIGURE 4 is a diagrammatic front elevation of the apparatus in which the cribbing mechanism is shown exploded and partially in perspective;

FIGURE 5 is an assembled view in section of the chuck member shown in FIGURE 3; and FIGURE 6 is an exploded perspective view of a second embodiment of a chuck member.

Figure 1:
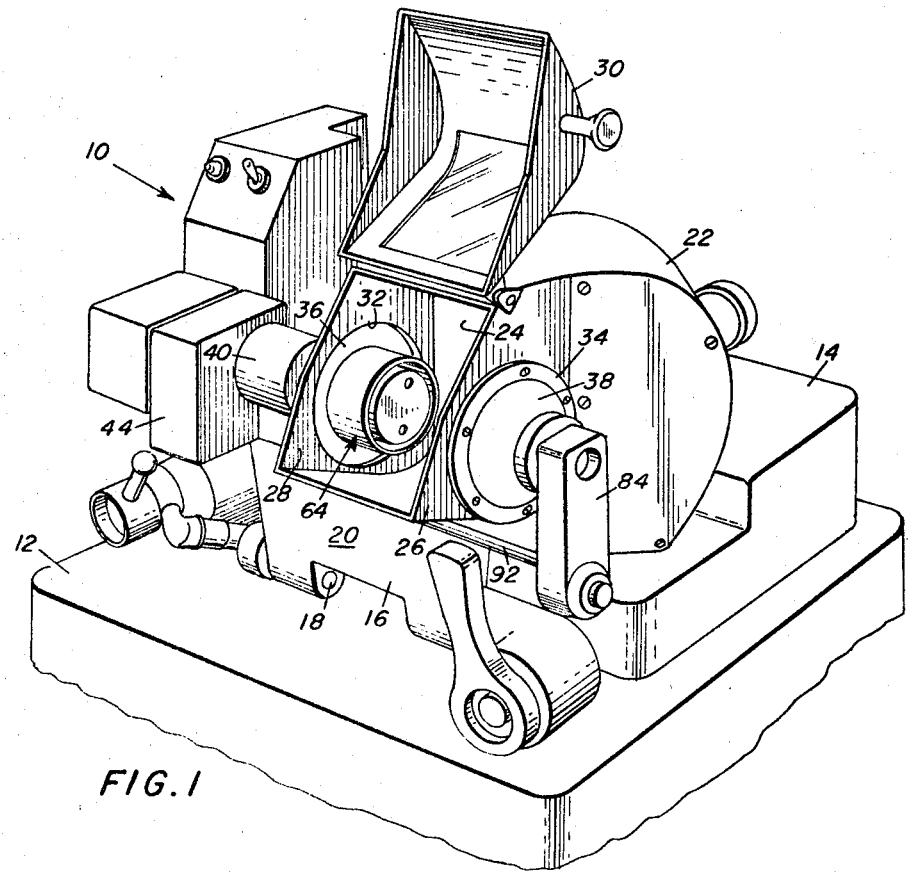
FIGURE 1 is a perspective view of the lens cribber of this invention.

Referring now to the drawings wherein like elements indicate like parts, numeral 10 indicates the lens cribbing device of this invention. The cribber is supported on a base 12 in which the oil reservoir and air compressor and other control apparatus is housed. Attached to the top surface of the base is a frame 14. Extending outwardly from the frame 14 is a split extension 16 having journals 17 and 17' in which pivot shafts 18 and 18' are rotatably secured. Mounted on the pivot shaft is a workpiece carrier 20 which is mounted on shafts 18 and 18'. Also mounted on base 14 is a grinding housing 22 which forms a grinding chamber 24 by way of side members 26 and 28 and a hinged transparent chamber cover 30. A rotating abrading tool T is supported within the housing.

Formed in the side walls 26 and 28 are apertures 32 and 34 in which are supported flexible grommets 36 and 38. Extending into chamber 24 through grommet 36 is a chucking shaft 40. The shaft 40 is rotated by an electric motor 44.

The end of the shaft 40 exterior of the chamber 24 carries a means 46 for removably supporting a lens pattern 48 in the well-known manner. Juxtaposed on base 14 opposite the lens pattern is a camming member 50 carried by an arm 51 which is pivotally disposed with respect to housing 24 about a pin 52. An air cylinder 54 having its base attached to the base 14 at lug 56 has its operating or piston end pivotally connected to the workpiece carrier 20 at 55. When pressurized to retract, the jack 54 draws the carrier 20 toward the abrading tool T until the lens edge engages the tool (see FIGURE 3). Inward motion toward the tool will continue except as the movement is limited by the camming structure. The pivoting cam member 50 carries a second cam 58 thereon which is positioned opposite a microswitch 60. The cam 58 has a flattened surface 62 the purpose of which will be explained more thoroughly hereinafter.

The shaft 40 carries a lens retaining chuck member 64 at that end disposed interiorally of chamber 24. This member is comprised of a sleeve 66 which is fixedly secured to shaft 40 by way of set screws or the like 68. The sleeve is marked with an indicia line 69 on its periphery and is positioned to shaft 40 so that line 69 is at the top. The sleeve 66 is counterbored at 70 and the counterbore receives a floating member 72 which is held in the bore by threaded members 74 and 76. The floating member 72 is spring biased outwardly by way of a coil spring 78 which is disposed between ledge 77 and the member. At its outer end the counterbore 70 has an outward taper 79.

Disposed opposite and coaxial with shaft 40 is a retaining arm 80 which is equipped with a rubber tip 82 at its outer end. The lens to be ground is secured between the retaining arm 80 and the chuck member 64. The arm 80 is rotatably secured in a standard 84 by way of a radial bearing 86. The standard 84 near its lower end is secured to horizontal slide member 88 which is guided for horizontal reciprocatory motion in a passageway 90 formed in the carrier 20. The standard 84 is operably connected to a piston arm 92 which forms a part of the air cylinder assembly 94. By pressurizing either of the expansion chambers in air cylinder 94, the standard 84 is moved toward and away from chuck 64 in order to grip or release a lens blank. The standard 84 of course pivots with the carrier 20.

When a lens is secured between the chuck 64 and the retaining arm 80 it is sometimes necessary, due to individual curvatures of the blank, to adjust the lens edge laterally with respect to the grinding edge of the abrading wheel. For these purposes, the carrier 20 and all those parts mounted thereto are movable laterally of the abrading wheel by way of a linkage 96 which is connected to a hand crank 98 in any suitable, conventional manner. When handle 98 is rotated the linkage assembly 96 moves the pivot shaft 16 and thus carrier 20 with respect to the base 14.

In operation, a blocked lens is inserted in front of member 64 with the end of the block flush with the outer face of member 72. The operator presses the block against the bias of spring 78 and the floating member 72 will cause the block to remain squared with the machine until the lens block is properly wedged against the taper 76. Thus the block will engage the taper on a circular line in a plane normal to the axis of shaft 40.

The lens is marked with a zero line which is matched by the operator with the indicia 69 to insure that the lens is properly oriented with pattern 48. When the lens and block are in position, the operator activates the cylinder 94 to draw the tip 82 against the unblocked face of the lens. The lens is then secured in the assembly. Since the lens edge is relatively close to the abrading wheel, the operator by making an adjustment with crank 98 can move the carrier 20 until the edge of the lens is disposed along the grinding surface of the abrading tool T. It is normally desired to have the lens edge as close to the center of the wheel as practical.

A pattern 48, of the desired peripheral shape, is secured to the outer end of shaft 40 and when the air cylinder 94 is activated, the lens head will be drawn into engagement with the diamond grinding wheel. The grinding or abrasion wheel is rotating via power circuitry not shown.

Figure 2:
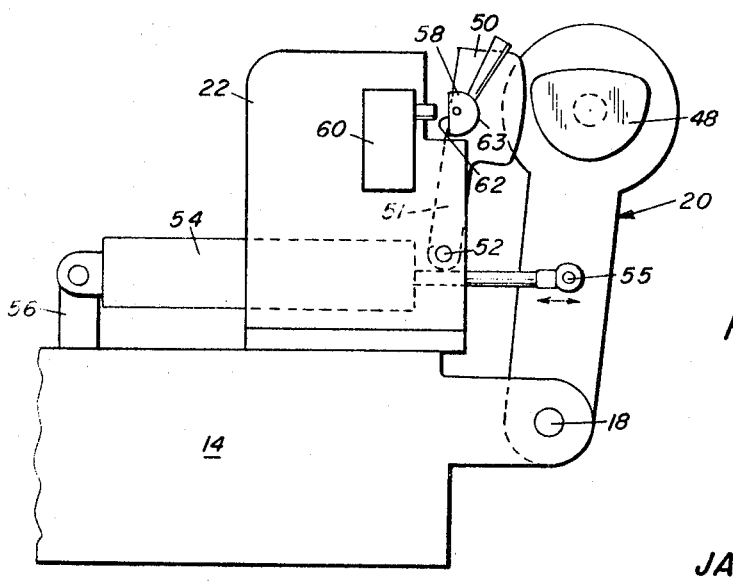
FIGURE 2 is a diagrammatic end elevation showing the principal power and moving elements.

As can best be seen in FIGURE 2, the jack 54 urges the lens pattern 48 continuously toward the cam 50. As previously noted, cam 50 carries a second cam 58 which is disposed opposite the arm of a microswitch 60. As grinding occurs and the arm 20 is moved in the counter-clockwise direction as glass is removed from the edge of the lens, the cam 58 will engage the switch 60 to a signal a further rotation of shaft 40. This particular arrangement for controlling lens rotation by a switching arrangement under the control of a lens pattern is well known to the art. It is the addition of the second cam 58 which is novel construction here. When surface 62 is toward the microswitch 60, it can be seen that the pattern 48 will be required to move a greater distance in the counter-clockwise direction before the microswitch 60 is contacted. Thus, the flattened surface 62 and the circular surface 63 provide a quick adjustment in determining the over-all lens dimension. It is to be remembered that the instant device is merely to remove excess glass from the edge of the lens and is not a lens finishing piece of equipment. Utilizing this arrangement, a minimum of lens patterns 48 need be stocked.

FIGURE 6 discloses a second embodiment of the lens chuck assembly. This embodiment relates particularly to the means for holding the lens in proper orientation with the pattern. In the embodiment of FIGURES 4 and 5, the operator was required to place an indicia mark on the lens to match it with the indicia mark 69 of the lens chuck. In the embodiment of FIGURE 6, the lens chuck is divided primarily into three major elements; namely, a first element 100, a second element 102 and a friction element 104 disposed therebetween. The element 102 forms the chuck face and has a pair of pins 106 and 108 extending outwardly therefrom which are adapted to engage the holes 110 and 112 in the lens block. The element 100 is fixedly securely to the shaft 40 by way of set screws 111 and the member 102 is rotatably mounted with respect to element 100. Note that element 100 is scored at 101 and the element 102 has a scale printed thereon. The position of the lens blank is oriented with respect to the pattern cam by a desired amount by rotating element 102. When the setting has been made, retaining arm 80 moves toward the lens face and the friction element 104 locks elements 100 and 102 together. Therefore, according to a predetermined prescription knowledge the lens blank can be oriented with the lens pattern in any desirable fashion.

What has been set forth above is intended primarily as examplary to enable those skilled in the art in the practice of the invention. It should, therefore, be understood that, within the scope of the appended claims, the invention may be practiced other than as specifically described.

What is new and, therefore, desired to be protected by Letters Patent of the United States Office is:

1. A lens cribbing apparatus for removing the excess glass from the edge of a lens blank having a block centrally secured to one surface thereof comprising
   a frame,
   a grinding chamber housing carried by said frame,
   a rotating abrading wheel having an abrading edge in said chamber,
   a carrier for supporting a lens blank with its mechanical axis generally parallel to said edge,
   said carrier being mounted for pivotal movement toward and away from said edge,
   first means for moving and controlling the movement of said carrier toward and away from said abrading wheel in accordance with a pre-established pattern,
   said first means comprising a rotatable journalled shaft in said carrier, an electric motor having an output rotatably driving said shaft, and a lens pattern secured to an end of said shaft and in engagement with a pivotally mounted first cam,
   a chucking face secured to the other end of said shaft in said chamber,
   a retaining arm mounted on said carrier,
   second means for moving said retaining arm toward and away from said chucking face, and
   third means slidably receiving said carrier along an axis parallel to said lens mechanical axis, whereby the periphery of said lens blank is adjustable with respect to said abrading edge.
   a microswitch mounted on said frame for controlling said electric motor and adapted to be actuated by said first cam, and
   a switching cam mounted on said first cam between said first cam and said microswitch being adjustable to effect a quick adjustment in the amount of pivotal movement of said first cam prior to actuating said microswitch said switching cam comprising a rotatable elongated cylindrical member having a flattened side surface, and a handle attached to said switching cam for rotating said switching cam for presenting the flattened side to said microswitch.

2. The apparatus of claim 1 wherein said second means comprises a fluid cylinder having its base end secured to said frame, a piston having a first end slidably received in said cylinder and a second end connected to said arm.

3. A lens cribbing apparatus for removing the excess glass from the edge of a lens blank having a block centrally secured to one surface thereof comprising
   a frame,
   a grinding chamber housing carried by said frame,
   a rotating abrading wheel having an abrading edge in said chamber,
   a carrier for supporting a lens blank with its mechanical axis generally parallel to said edge,
   said carrier being mounted for pivotal movement toward and away from said edge,
   first means for moving and controlling the movement of said carrier toward and away from said abrading wheel in accordance with a preestablished pattern,
   a chucking face supported by said carrier in said chamber,
   said chucking face having a depression for receiving said block, a member slidably received in said depression, a spring in said depression between the depression bottom and the outer end thereof for biasing said member toward said outer end whereby, when said block is inserted into said depression, it is moved against said bias,
a retaining arm mounted on said carrier,
second means for moving said retaining arm toward and away from said chucking face, and
third means slidably receiving said carrier along an axis parallel to said lens mechanical axis, and whereby the periphery of said lens blank is adjustable with respect to said abrading edge.

4. The apparatus of claim 3 wherein said outer end is tapered outwardly.

5. The apparatus of claim 4 wherein said chuck face mechanism includes orientation means for relating the curves of said lens with said lens pattern.

References Cited
UNITED STATES PATENTS

| | | | |
|---|---|---|---|
| 2,166,037 | 7/1939 | Campos | 51—101 X |
| 2,573,668 | 10/1951 | Long | 51—217 X |
| 2,982,061 | 5/1961 | Dillon | 51—277 |
| 3,119,206 | 1/1964 | Baumgartner | 51—101 |
| 3,121,979 | 2/1964 | Gray | 51—101 |
| 3,332,172 | 7/1967 | Stern | 51—101 |

ROBERT C. RIORDON, *Primary Examiner.*

D. G. KELLY, *Assistant Examiner.*